United States Patent
Bryden

(10) Patent No.: US 6,753,089 B2
(45) Date of Patent: Jun. 22, 2004

(54) ZIRCON/ZIRCONIA MIX FOR REFRACTORY COATINGS AND INKS

(75) Inventor: Raymond H. Bryden, Holden, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 10/154,134

(22) Filed: May 23, 2002

(65) Prior Publication Data

US 2004/0018395 A1 Jan. 29, 2004

(51) Int. Cl.$^7$ .................. B32B 18/00; C04B 35/14; C04B 35/185; C04B 35/48
(52) U.S. Cl. ............. 428/446; 336/697; 336/698; 336/701; 336/702; 501/102; 501/103; 501/106
(58) Field of Search ............. 428/446, 689, 428/697, 698, 701, 702, 336; 106/600, 635, 638; 501/102, 103, 106

(56) References Cited

U.S. PATENT DOCUMENTS

| | | | |
|---|---|---|---|
| 4,319,925 A | * 3/1982 | Brown | ............ 106/38.27 |
| 4,804,589 A | 2/1989 | Matsui et al. | |
| 4,921,721 A | 5/1990 | Matsui et al. | |
| 4,950,558 A | 8/1990 | Sarin | |
| 6,165,594 A | 12/2000 | Moh et al. | |
| 6,214,250 B1 | 4/2001 | Moh et al. | |
| 6,251,212 B1 | 6/2001 | Moh et al. | |

FOREIGN PATENT DOCUMENTS

| | | | | |
|---|---|---|---|---|
| DE | 2600780 | | 8/1976 | |
| DE | 2600780 A | * | 8/1976 | ............ B22C/1/00 |
| DE | 3118432 A | * | 11/1982 | ............ C04B/35/56 |
| JP | 04317461 | | 11/1992 | |
| JP | 04317461 A | * | 11/1992 | ............ C04B/35/16 |
| JP | 07215782 | | 8/1995 | |
| JP | 07215782 A | * | 8/1995 | ............ C04B/41/87 |

OTHER PUBLICATIONS

"Corrosion Resistant Coatings for Silicon Carbide" by Jeffrey R. Price and Mark Van Roode, Solar Turbine Incorporated, SanDiego, CA (pp. 469–493).

"The Development of Protective Coatings for Ceramic Tubular Components" Topical REport (Mar. 1986–Dec. 1987), GRI–88–005, Gas Research Institute, 8600 West Bryn Mawr Avenue, Chicago, Illinois 60631, Reproduced by U.S. Department of Commerce, National Technical Information Service, Springfield, VA 22161.

* cited by examiner

*Primary Examiner*—Stephen Stein
(74) *Attorney, Agent, or Firm*—McCormick, Paulding & Huber LLP

(57) ABSTRACT

Refractory coatings comprising unstabilized zirconia, silica, and, optionally, zircon and/or mullite are disclosed herein. The unstabilized zirconia, silica, and optional zircon and/or mullite are applied as a slurry onto ceramic substrates such as silicon carbide and fired. The refractory coatings of the present invention maintained good edge definition and color when applied to ceramic substrates and subjected to temperatures over 1100° C.

21 Claims, No Drawings

ZIRCON/ZIRCONIA MIX FOR REFRACTORY COATINGS AND INKS

FIELD OF THE INVENTION

This invention relates to coatings on refractory materials, in particular, zircon/zirconia coatings on ceramic substrates.

BACKGROUND OF THE INVENTION

High temperature coatings for ceramics, such as silicon carbide (SiC), silicon nitride ($Si_3N_4$), are prone to failure in oxidizing conditions at elevated temperatures due to interactions with a growing silicon dioxide ($SiO_2$) glass layer. The most stable candidates for coatings are found to be alumina-($Al_2O$), mullite- ($3Al_2O_3 \cdot 2SiO_2$), and zirconia-($ZrO_2$) based formulations due to their refractory nature, similar coefficients of thermal expansion, and chemical stability in contact with silicon carbide, silicon nitride, and silicon dioxide.

At temperatures above 1200° C., porous alumina coatings will dissolve into the growing silicon dioxide layer. The resulting aluminosilicate glass fills the pores of the alumina coating creating an impermeable membrane. This membrane traps gaseous by-products of the oxidation reaction, such as carbon dioxide. The filled pores coalesce causing the coating to blister or flake off. Dense alumina coatings would tend to crack and craze due to the higher coefficient of thermal expansion. When the alumina coating is used in an ink application, the dissolution of the alumina coating bleeds into the glass leading to bleed-out of the white coating along the edges. For thin coatings, this is especially problematic as they will either fully dissolve into the glass layer or otherwise become invisible.

Similarly, mullite coatings on silicon carbide/silicon nitride ceramics are susceptible to blistering and flaking, and also become translucent when a substantial quantity of the glass layer is present. Stabilized zirconia coatings are known to be chemically stable and have limited solubility in glass. However, zirconia, stabilized with calcium or yttria, were found to flake off the silicon carbide parts after one or two high temperature cycles at or about 1100° C.

The prior art discloses a number of coatings for refractory substrates. U.S. Pat. Nos. 4,804,589 and 4,921,721, both to Matsui et al., disclose a coating for metals and silicon carbide substrates consisting essentially of zirconia partially or fully stabilized with yttria, magnesium oxide, or calcium oxide. The coatings are deliberately kept thin to decrease peeling and crazing. A compatibilizing layer may be added between the zirconia layer and the substrate. Matsui et al. further requires a surface pre-treatment for silicon carbide substrates for surface roughening or reactivity enhancement. The practicality of coating refractory substrates with the current coating composition is diminished with the need for surface pre-treatments. Also, thicker coatings are prone to peeling and cracking.

U.S. Pat. No. 4,950,558 to Sarin discloses a graded coating for silicon based substrates, the coating comprising multiple layers: one or more intermediate layers of aluminum nitride or aluminum oxynitride material, and an outer layer of an oxide of aluminum, zirconium, or yttrium. The coatings are prepared using chemical vapor deposition with a mixture of gases in a continuous deposition process in which the reactant gases are changed gradually to provide the graded layers. It would be desirable to provide a coating which does not have the environmental concerns associated with chemical vapor deposition.

U.S. Pat. Nos. 6,165,594, 6,214,250, and 6,251,212, all to Moh et al., disclose a label for metal and ceramic substrates. The label includes a ceramic body as a base layer which contains a glassy phase which wets the substrate and a refractory phase with light or dark particles; a top layer also contains a glassy phase and a refractory phase with contrasting particles. The color contrast between the top layer and the ceramic body allows for an optically discernible labeling pattern. However, the individual labels must be formed and fired prior to being attached to a substrate.

Notwithstanding the state of the art, it is desirable to provide coating compositions for high temperature refractory ceramic substrates which provide ease of use, good adhesion, and stability in an oxidizing atmosphere.

SUMMARY OF THE INVENTION

The present invention is directed to, in a first aspect, a refractory coating composition for coating high temperature substrates, the composition comprising: unstabilized zirconia; and silica. Preferably, the unstabilized zirconia is present in an amount of about 50 to about 90 parts per hundred of the composition. Preferably, the silica is present in an amount of about 10 to about 50 parts per hundred of the composition. The composition may further include zircon which may be present in an amount of up to 100 parts per hundred of the composition. The composition may also include an inorganic filler such as mullite present in an amount of up to about 50 parts per hundred of the composition. In a preferred embodiment of the composition of the first aspect, the unstabilized zirconia and the silica are present in a weight ratio of about 9:1 to about 1:1. The composition is useful for coating substrates at temperatures greater than about 1100° C.

In a second aspect, the present invention is directed to a refractory coating composition comprising: about 15 to about 75 parts per hundred unstabilized zirconia; about 5 to about 25 parts per hundred silica; and up to about 100 parts per hundred zircon. The composition may be applied as a slurry or as a decal on a substrate. Preferably, the composition is applied as a thin film having a thickness of about 20 to about 500 microns.

In a third aspect, the present invention is directed to a ceramic sintered member comprising: a ceramic body; and a refractory coating formed on a surface of the ceramic body, the refractory coating comprising: unstabilized zirconia; silica; and zircon, wherein the refractory coating maintains stability at temperatures in excess of about 1100° C. Preferably, the ceramic body comprises silicon carbide or silicon nitride.

In a fourth aspect, the present invention is directed to a method of making a ceramic sintered body comprising the steps of: providing a ceramic substrate; providing a refractory coating composition comprising: unstabilized zirconia; silica; and zircon; applying the refractory coating composition on the ceramic substrate; and exposing the coated ceramic substrate to sintering conditions, wherein the refractory coating on the ceramic substrate maintains stability at temperatures greater than about 1200° C. Preferably, the ceramic substrate comprises silicon carbide or silicon nitride. The refractory coating composition may be applied to a portion of the ceramic substrate. The refractory coating composition and the ceramic substrate may be different colors and the composition is applied to a portion of the ceramic substrate as a marker. Preferably, the refractory coating composition is painted, spray coated, sponged, brush coated, or screen printed on the ceramic substrate.

DETAILED DESCRIPTION OF THE PREFERRED EMBODIMENTS

The present invention relates to refractory coating compositions for coating high temperature substrates including unstabilized zirconia, silicon dioxide or silica, and optionally, zircon. Unexpectedly, the coating compositions of the present invention maintain good adhesion to refractory substrates at temperatures up to and over about 1100° C. preferably, over 1200° C., and more preferably over 1400° C. These coating compositions are particularly useful as inks for labeling refractory substrates. When used as an ink on refractory substrates, the coating compositions demonstrated clean lines which did not bleed into the substrate and maintained a good contrast with the substrate, even after multiple heat cycles. As used herein, zircon shall mean $ZrSiO_4$ and/or its decomposition products $SiO_2$ and $ZrO_2$.

The refractory coating compositions of the present invention may be expressed in terms of parts per hundred by weight where the total weight of the composition is equal to a hundred (100) parts and the sum of the constituent parts equal to a hundred parts. A preferable composition may have from about zero to 100 parts per hundred zircon. Where the amount of zircon is less than 100 parts per hundred, the remainder of the composition may include about 50 to about 90 parts per hundred unstabilized zirconia, preferably about 15 to about 75 parts per hundred, and about 10 to about 50 parts per hundred silica, preferably about 5 to about 25 parts per hundred. Preferably, the unstabilized zirconia and silica are in a weight ratio of about 9:1 to about 1:1, more preferably about 4:1 to about 2:1, and most preferably about 3:1.

It is hypothesized that at the extreme temperatures at which the refractory coatings are subjected to, the unstabilized zirconia when combined with silica, forms zircon which has low solubility in the silicon dioxide layer and is physically stable when in contact with the silicon dioxide.

The unstabilized zirconia suitable for use in the coating compositions of the present invention is preferably high purity monoclinic zirconia. Monoclinic zirconia is one of three crystal structures of zirconia that is stable at temperatures of less then 1150° C.; at temperatures above 1150° C., the zirconia has a tetragonal crystal structure capable of a martensitic transformation back to the monoclinic crystal structure involving a 3 to 6 percent volume expansion when the tetragonal zirconia is not stabilized. The average particle size of the monoclinic zirconia is about 0.1 to about 200 microns, preferably 0.5 to about 2.0 microns, more preferably about 1.0 to about 10 microns, and most preferably about 45 microns. A particularly desirable unstabilized zirconia is commercially available under the trade name ZIRCOA A-325 from Saint-Gobain/Norton Industrial Ceramics Corporation, Worcester, Mass. Colored zirconia may be substituted with or used in combination with the monoclinic zirconia to create colored coatings and inks.

It is within the scope of the invention that partially or fully stabilized zirconia, if combined with sufficient zircon or silica, can be made into a refractory coating composition. It is hypothesized that the partially or fully stabilized zirconia react with the silica to form the more stable zircon. Alternatively, if there is sufficient zircon present, the stabilized zirconia will be less prone to dissolve into the growing silicon dioxide layer.

Silica suitable for use in the coating compositions of the present invention is an amorphous silica. Preferably, the amorphous silica has an average particle size of about 0.1 to about 1.0 micron, preferably about 0.5 microns, of spherical primary particles and agglomerates. The specific surface area is preferably about 15 to about 30 $m^2/g$. A particularly desirable commercially available silica is MICROSILICA® from Elkem Materials, Norway. Numerous grades are available for refractory coatings such as Grade 983, Grade 971, Grade 965, and Grade 940, with Grade 971 being especially preferred. Preferably, a densified microsilica is used that contains loosely bonded secondary agglomerates which increase the bulk density to about 500 to about 650 $kg/M^3$, and improve handling characteristics of the material.

Zircon useful in the coating compositions of the present invention has an average particle size of about 10 to about 20 microns, preferably about 12.8 microns. The surface area is about 0.8 to about 2.0 $m^2/g$, preferably about 1.2 $m^2/g$. A particularly desirable zircon is commercially available from Saint-Gobain/Norton Industrial Ceramics Corporation of Worcester, Mass. under the trade name ZIRCON G. Colored zircon may also be substituted for or used in combination with the zircon to create colored coatings and inks.

The composition may also include inorganic fillers which do not react with the silica and are tolerant of the extreme temperatures, i.e., do not burn off. Such inorganic fillers include, for example, mullite. As used herein, mullite shall mean $3Al_2O_3 \cdot 2SiO_2$. The mullite may preferably be present in an amount of up to about 50 parts per hundred parts of the total composition. It may also be used in place of the zircon. Thus, one embodiment of the present invention may include up to about 50 parts per hundred mullite, and the remainder of the composition may include about 25 to about 90 parts per hundred unstabilized zirconia, preferably about 45 to about 50 parts per hundred, and about 5 to about 50 parts per hundred silica, preferably about 10 to about 25 parts per hundred. Again, the unstabilized zirconia and silica are preferably in a weight ratio of about 9:1 to about 1:1, more preferably about 4:1 to about 2:1, and most preferably about 3:1.

A particularly suitable mullite is commercially available from Washington Mills Electro Minerals Company, Niagra Falls, N.Y., under the trade name DURAMUL™. Preferably, there is an excess of aluminum oxide in the mullite to ensure that all of the silicon dioxide is contained within the mullite phase and is not present in the glass phase. The average particle size of the mullite is about 0.2 to about 250 microns, preferably about 1.0 to about 100 microns, and more preferably about 2.0 to about 45 microns. A most preferred mullite is DURAMUL™ 325/F.

The unstabilized zirconia, silica, and optional zircon and mullite, are preferably applied onto the substrate surface as a slurry in an appropriate medium. The slurry medium may be organic or inorganic. Water is a preferred slurry medium for suspending the constituents of the refractory coating of the present invention. The unstabilized zirconia, silica, and optional zircon and mullite may be kept in suspension using one or more stabilizers such as thickeners, thixotrophic agents, or other rheology modifiers to provide an appropriately viscous ink or coating. A preferred stabilizer for an aqueous slurry is KELCOLOID LVF from Monsanto Company, St. Louis, Mo. Preferably, the stabilizer is present in an amount of about 0.1 to about 2.0 weight percent, preferably about 1.2 weight percent. Thus, an exemplary slurry medium may consist of 98.8 weight percent deionized water and 1.2 weight percent KELCOLOID LVF. Another method of keeping the coating composition constituents suspended in an aqueous slurry includes pH adjustment with an acid or base to achieve a stable or semi-stable electrostatic dispersion. Stabilizers may also be added to the electrostatic dispersion to ensure that the constituents of the coating remain suspended in the liquid.

The unstabilized zirconia, silica, and optional zircon and mullite are added to the slurry medium and mixed for a sufficient time to achieve a uniform suspension. Typically, the mixing time is at least about 10 to about 15 minutes although longer mixing times of an hour are not atypical as longer mixing times do not harm the ink or coating composition. The slurry contains about 40 to about 60 weight percent solids.

The slurry is preferably of a consistency where it may be easily applied to the substrate depending upon the method of application. Methods of applying the slurry to the substrate include painting, smearing, brush coating, spray coating, sponging, screen printing, and the like. Depending upon the application, the coating composition may be applied in a thickness of about 20 to about 500 microns when painted on. For example, when applying a decal, the coating composition maybe applied in a thickness of about 50 microns using screen printing techniques with a 325 mesh. One of skill in the art will understand when and how to use the different techniques for applying the coating composition and in what thickness without undue experimentation. Multiple layers of coatings may also be applied when appropriate. Upon application of the coating composition, the substrate is heated to drive off the slurry medium prior to firing the ink or coating onto the substrate.

EXAMPLES

The following examples describes the preparation and use of the refractory coating compositions of the present invention. These example are presented for the purpose of further illustrating and explaining the invention, and are not to be taken as limiting the scope of the invention.

A 100 gram sample of the total constituents in parts per hundred by weight of each coating composition in their respective amounts were suspended in a 1.0 weight percent aqueous solution of KELCOLOID LVF. The constituents of the coating compositions were added to the KELCOLOID LVF solution in a water tight mixing jug and rolled with inert mixing media to ensure adequate mixing and suspension for about an hour. Each coating composition had about 40 weight percent solids. Each heat cycle was about 72 hours with an average rate of heating at about 75° C./hour to a maximum temperature of about 1420° C. followed by controlled cooling to room temperature.

Example 1
(Comparative)

A comparative coating composition was formulated with 50.0 parts by weight A-15 alumina obtained from Alcoa, Inc., Pittsburgh, Pa., and 50 parts by weight yttria-stabilized zirconia slurried with the KELCOLOID LVF solution. The composition was brushed onto the surface of silicon nitride bonded silicon carbide tile, using an artist's brush in a thickness of about 100 microns and the sample was dried to remove water from the slurry. After 5 heat cycles, about 25% of the composition flaked away after the first heat cycle. The remaining composition formed small brown blisters on the tile.

Example 2
(Comparative)

A comparative coating composition was formulated with 100 parts by weight yttria-stabilized zirconia having a mesh size of 20F. The stabilized zirconia coating composition was slurried in the KELCOLOID LVF solution. All but about 10% of the coating flaked off. The remaining portion had good edge definition although some grains were too coarse and did not provide a smooth surface.

Example 3

A coating composition of the present invention was formulated with 100 parts by weight ZIRCON G from slurried in the KELCOLOID LVF solution. The composition was brushed onto a silicon nitride bonded silicon carbide tile in a thickness of about 100 microns using an artist's brush. After three heat cycles, the composition maintained good edge definition and color contrast with the tile.

Example 4

A coating composition of the present invention was formulated with 56.25 parts by weight unstabilized zirconia, 18.75 parts by weight densified MICROSILICA Grade 971 from Elkem Materials, and 25.0 parts by weight ZIRCON G, and slurried in the KELCOLOID LVF solution. The composition was brushed onto a silicon nitride bonded silicon carbide tile. After three heat cycles, the composition maintained good edge definition and color contrast with the tile.

Example 5

A coating composition of the present invention was formulated with 37.5 parts by weight unstabilized zirconia, 12.5 parts by weight densified MICROSILICA Grade 971 from Elkem Materials, and 50.0 parts by weight ZIRCON G, and slurried in the KELCOLOID solution. The composition was brushed onto a silicon nitride bonded silicon carbide tile. After three heat cycles, the composition maintained good edge definition and color contrast with the tile.

Example 6

A coating composition of the present invention was formulated with 18.75 parts by weight unstabilized zirconia, 6.25 parts by weight densified MICROSILICA Grade 971 from Elkem Materials, and 75.0 parts by weight ZIRCON G and slurried in the KELCOLOID LVF solution. The composition was brushed onto a silicon nitride bonded silicon carbide tile. After three heat cycles, the composition maintained good edge definition and color contrast with the tile.

Example 7

A coating composition of the present invention was formulated with 37.5 parts by weight unstabilized zirconia, 12.5 parts by weight densified MICROSILICA® Grade 971 from Elkem Materials, and 50.0 parts by weight DURA-MUL™ mullite from Washington Mills Electro Minerals Company. The composition was slurried in the KELCOLOID LVF solution and brushed onto a silicon nitride bonded silicon carbide tile. After three heat cycles, the composition maintained good edge definition and color contrast with the tile.

The refractory coating compositions of the present invention provide enhanced adhesion with good edge definition when applied to a refractory substrate. Advantageously, the coating compositions do not flake off when subjected to multiple heat cycles at extreme temperatures over 1100° C. nor do they dissolve into the growing silicon dioxide layer when used in an oxidizing atmosphere.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A refractory coating composition for coating high temperature substrates, said composition comprising:
   unstabilized zirconia in an amount greater than 56 parts per hundred to about 90 parts per hundred of said composition; and
   silica in an amount greater than 26 parts per hundred to about 50 parts per hundred of said composition.

2. The composition of claim 1 further including zircon.

3. The composition of claim 1 further including zircon in an amount greater than 21 parts per hundred of said composition.

4. The composition of claim 1 further including an inorganic filler.

5. The composition of claim 1 wherein the composition is for coating substrates at temperatures greater than about 1100° C.

6. A refractory coating composition for coating high temperature substrates, said composition comprising:
   unstabilized zirconia;
   silica; and
   mullite.

7. A refractory coating composition for coating high temperature substrates, said composition comprising:
   unstabilized zirconia;
   silica; and
   mullite in an amount of up to about 50 parts per hundred of said composition.

8. A refractory coating composition comprising:
   about 15 to about 75 parts per hundred unstabilized zirconia;
   about 5 to about 25 parts per hundred silica; and
   zircon in an amount greater than 21 parts per hundred.

9. The composition of claim 8 further including an inorganic filler.

10. The composition of claim 8 wherein the composition is applied to a ceramic substrate.

11. The composition of claim 8 wherein the composition is applied as a slurry.

12. The composition of claim 8 wherein the composition is applied as a decal on a substrate.

13. The composition of claim 8 wherein the composition is applied as a thin film having a thickness of about 20 to about 500 microns.

14. A refractory coating composition comprising:
   about 15 to about 75 parts per hundred unstabilized zirconia;
   about 5 to about 25 parts per hundred silica;
   zircon in an amount greater than 21 parts per hundred zircon; and
   mullite as an inorganic filler.

15. A refractory coating composition comprising:
   about 15 to about 75 parts per hundred unstabilized zirconia;
   about 5 to about 25 parts per hundred silica;
   zircon in an amount greater than 21 parts per hundred; and
   mullite in an amount of up to about 50 parts per hundred of said composition.

16. A ceramic sintered member comprising:
   a ceramic body; and
   a refractory coating formed on a surface of said ceramic body, said refractory coating comprising:
   unstabiized zirconia;
   silica; and
   zircon in an amount greater than 21 parts per hundred, wherein said refractory coating maintains stability at temperatures in excess of about 1100 degrees C.

17. The member of claim 16 wherein said refractory coating formed on a surface of said ceramic body has a thickness of about 20 to about 500 microns.

18. The member of claim 16 wherein said ceramic body comprises silicon carbide or silicon nitride.

19. The member of claim 16 wherein said ceramic body and said refractory coating are different colors such that said refractory coating provides a marking on said ceramic body.

20. A ceramic sintered member comprising:
   a ceramic body; and
   a refractory coating formed on a surface of said ceramic body, said refractory coating comprising:
   unstabilized zirconia;
   silica;
   zircon; and
   mullite;
   wherein said refractory coating maintains stability at temperatures in excess of about 1100 degrees C.

21. A refractory coating composition comprising:
   unstabilized zirconia;
   silica; and
   zircon in an amount greater than 21 parts per hundred.

* * * * *